Nov. 1, 1955 — F. E. DICKEY ET AL — 2,722,659

TESTING DEVICE

Filed Aug. 31, 1954 — 2 Sheets-Sheet 1

Inventors:
Fred E. Dickey,
Jack C. Hobbs,
by *[signature]*
Their Attorney.

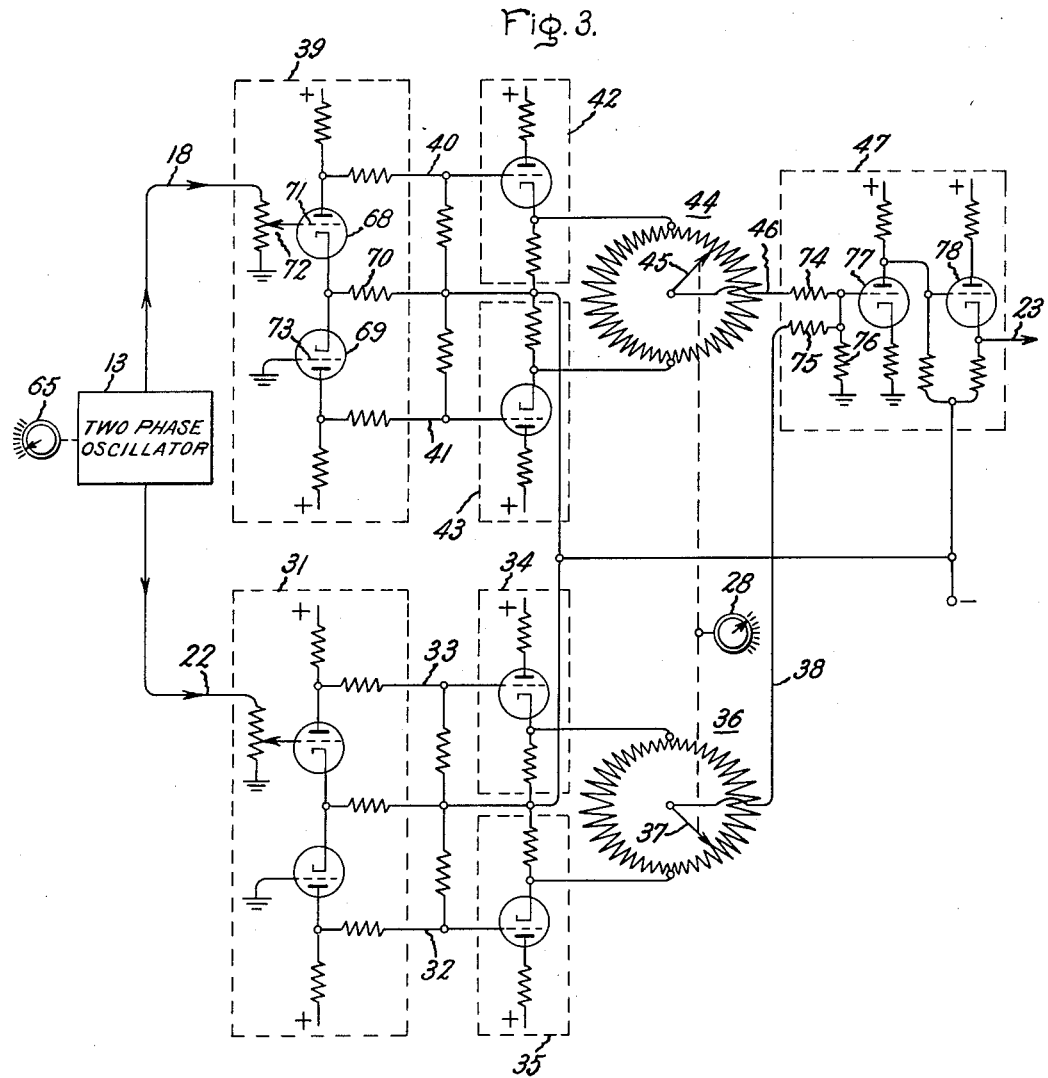

United States Patent Office 2,722,659
Patented Nov. 1, 1955

2,722,659

TESTING DEVICE

Fred E. Dickey, Schenectady, and Jack C. Hobbs, Burnt Hills, N. Y., assignors to General Electric Company, a corporation of New York Application August 31, 1954, Serial No. 453,258

10 Claims. (Cl. 324—57)

This invention generally relates to apparatus for determining the frequency response of transducer elements, and more particularly to apparatus for measuring the differing time phase shifts and attenuations of electrical signals of varying frequency passing through a transducer.

In the art of synthesizing automatic mechanisms, commonly termed servo-mechanisms, it is necessary to measure the transfer function of the components and of the combination of components constituting the mechanism, where the transfer function is defined as the differing phase shift and attenuation in amplitude that alternating current signals of varying frequency undergo when passing through the component. Heretofore, these measurements have been made semi-empirically by injecting input signals of differing frequency into the device and comparing the amplitude and phase shift of the resulting output with this input. Prior electronic devices for performing these measurements have employed laboratory instruments, including oscillators and phase shifters, for making these comparisons. However, these instruments require individual calibration at each frequency limiting the applicability of these testers to the laboratory and requiring time consuming adjustments. Prior electromechanical devices for performing these functions have employed motor driven selsyn arrangements which are both larger and heavier than is desirable and are limited to low frequency testing.

In accordance with the present invention, an all electronic and electrical testing apparatus is provided that possesses the features of being compact, light weight, inexpensive, and portable, while at the same time having a wide frequency range extending into the relatively high frequency band. In addition, the present invention provides a reference means for phase shifting and attenuating that is insensitive to frequency variations, therefore obviating the need for recalibration and adjustment of the apparatus for each of the differing frequency measurement and permitting the apparatus to be expeditiously used for testing both in the field and in the laboratory.

More specifically in accordance with one form of the present invention, a variable simulator is provided for reproducing the phase shift and attenuation of an electrical signal passing through a transducer at any one of a wide range of frequencies. This simulator being comprised of components whose values are invariant with frequency and therefore provides a measurable phase shift and attenuation that maintain proportionality with adjustment irrespective of frequency.

It is accordingly one object of the present invention to provide a new and improved device for determining the transfer function of a transducer, that is both lightweight, compact, portable, and operable over a wide frequency band.

A further object of the invention is to provide a new and improved device for rapidly determining the time phase shift and attenuation of an alternating current signal passing through a transducer, at any one of a wide band of frequencies.

A still further object of the present invention is to provide a constant amplitude signal that is time phase shiftable over a complete cycle and whose phase shift is in the same direct proportion to adjustment irrespective of frequency.

A still further object of this invention is to provide an oscillator for generating two 90° displaced reference signals of the same frequency over any one of a wide range of frequencies, maintaining the 90° displacement of these signals constant over said range.

A still further object of this invention is to provide a device for obtaining a time phase shiftable signal having a constant amplitude irrespective of frequency variation and time phase position and being controllable in phase in direct proportion to adjustment irrespective of frequency variation and without a need for recalibration with frequency.

Other objects and many attendant advantages of this invention will be more readily comprehended upon a detailed consideration of one preferred embodiment of the invention taken with the accompanying drawings, wherein:

Fig. 3 is a detailed electrical drawing of the remaining preferred circuitry of Fig. 1.

Figure 1:
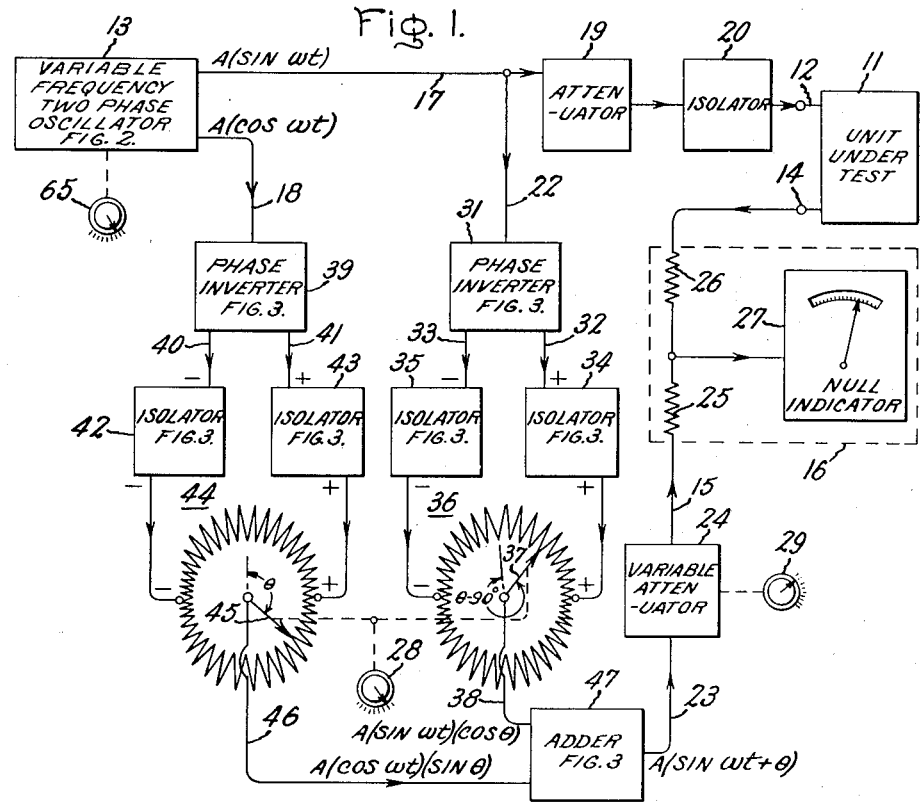
Fig. 1 is a schematic drawing of one preferred embodiment of the invention, in block diagram form.

Referring now to Fig. 1 for a consideration of one embodiment of the invention, the transducer 11 being tested which may comprise a motor, circuit network, or the like is energized by a signal over line 12 from a variable frequency oscillator 13 and the output from this transducer is transmitted over line 14. Reference signals of the same frequency that may be both phase shifted and attenuated are also initially derived from oscillator 13 and, after passing through the phase shifting and attenuating mechanism in the central and lower portions of the figure that are adapted to simulate the characteristics of the transducer, are transmitted over line 15 and compared with the transducer output signal by means of the null circuit shown within the dotted box 16. By phase shifting these reference signals and attenuating these signals into null with the output signal, the phase shift and the attenuation of the transducer under test are determined by noting the readings of the reference phase shifter and attenuator. Similarly, by repeating this measurement for each frequency within the frequency band under consideration, the resulting data yields the over-all transfer function of the transducer.

Considering this preferred circuitry more specifically, the variable frequency oscillator 13 provides two 90° displaced signals of the same frequency over output lines 17 and 18. The signal over line 17 is directed through an attenuator circuit 19 and an isolator circuit 20 to energize the transducer 11 under test, and is also directed downwardly over line 22 to enter one portion of the phase shifter circuit, more completely described hereinafter. The second of said 90° displaced signals is directed downwardly over line 18 to enter the second portion of said phase shifter, and the resultant phase shifted reference signal taken from the combination of these signals is transmitted upwardly over line 23, through variable attenuator 24, then into two series connected resistors in a difference circuit having a null indicating oscilloscope, recorder or the like 27, which can be an external unit or built-in, at the common junction thereof, as shown. The output signal from the device 11 under test is conveyed over line 14 to the other input and the difference of these signals is read from indicator 27. To determine the phase shift and attenuation of the device under test at any frequency, the reference signal is initially phase shifted by adjusting knob 28, which is preferably calibrated to indicate phase displacement, until the reference signal is in opposite time phase with the output signal from the transducer and the indicator 27 approaches null reading. Then the reference signal is attenuated by adjusting attenuator knob 29 until a substantially true null is obtained. Upon reaching null, the phase shift and attenuation of the device under test at that frequency are noted by the calibrated readings of the phase shifter control knob 28 and attenuator control knob 29. These measurements are then repeated for each frequency in the frequency band under test to obtain the over-all transfer function of the transducer.

Considering this apparatus in another light, it is observed that the function of the phase shifter and attenuator is to simulate the phase shift and attenuation of the transducer under test for each frequency measured, and to provide a readily measurable means for indicating the degree of phase shift and attenuation.

The phase shifter of the present invention provides a constantly proportional degree of phase shift of the reference signal with adjustment irrespective of frequency and, therefore, eliminates the need for recalibration thereof at each different frequency as common to devices of the prior art. That is, a given adjustment of the phase shifter, for example 10°, provides a 10° phase shift of the reference signal irrespective of whether the reference signal is 2 cycles per second or 200 cycles per second. This phase shifter operates by taking two reference signals 90° out of phase, mathematically expressed as $A \sin wt$ and $A \cos wt$ and simultaneously modulates the first in accordance with the cosine of the desired angle of phase shift $\theta$ or:

$$A(\sin wt)(\cos \theta)$$

and modulates the second in accordance with the sine of the desired angle of phase shift $\theta$ or:

$$A(\cos wt)(\sin \theta)$$

By summing these modulated signals:

$$A(\sin wt)(\cos \theta) + A(\cos wt)(\sin \theta) = A \sin (wt+\theta)$$

it is observed that the resulting reference signal is time phase displaced from the first signal by the same angle $\theta$, irrespective of the frequency.

Referring again to Fig. 1 for the details of this preferred phase shifter, this first reference signal proportional to sine $wt$ is directed downwardly over line 22 to a phase inverter circuit 30 and is there split into two 180° time displaced signals, $A$ sine $wt$ and $-A$ sine $wt$. These two latter signals are then each conveyed over different ones of the two lines 32 and 33, through the two amplifier isolator circuits 34 and 35 to opposite fixed terminals of a sinusoidally wound potentiometer 36, having a movable slider 37. The zero position of potentiometer slider 37 is physically displaced 90° from the midpoint of the end terminals thereof and as a result movement of this slider attenuates the reference signal in accordance with the cosine of its displacement. Mathematically stated, the output voltage taken from slider 37 over line 38 may be expressed as $\mp (A \sin wt)(\cos \theta)$, where $\theta$ is the angular displacement of slider 37 from its zero position.

The second reference signal over line 18 is also phase inverted through a circuit 39 and split into positive and negative components over lines 40 and 41. These components are then directed through identical amplifier isolator circuits 42 and 43 to opposite end terminals of a second sinusoidally wound potentiometer 44 having a movable slider 45 positioned to move with the first slider 37. The zero position of slider 45 unlike slider 37 of the first potentiometer is located at the midpoint between the end terminals of the potentiometer and therefore movement of this slider attenuates the phase split reference signals in accordance with the sine of the angle of displacement or provides a signal over line 46 proportional to $\pm(A \cos wt)(\sin \theta)$, where $\theta$ is the angular displacement of slider 45 from its zero position.

The two 90° displaced reference signals attenuated in accordance with the sine and cosine of the desired angle of displacement are then summed by the adding circuit generally designated 47, and the output therefrom over line 23 leading to the variable attenuator circuit 24 constitutes a constant amplitude reference signal time phase displaced from the oscillator reference signal over line 22 in proportion to the displacement of potentiometers and sliders 37 and 45, both of which are positioned in unison by rotation of calibrated knob 28, as shown. Variable attenuator 24 varies the amplitude of this signal in accordance with the calibrated position of knob 29, and after attenuation, this reference is transmitted upward over line 15 to the input of the comparator circuit as discussed above.

Variable attenuator 24 in its simplest form may be comprised of a single potentiometer (not shown) having its slider positioned by a calibrated knob 29, or for greater accuracy may be comprised of a plurality of precision resistors in a potential dividing circuit network having a switching arrangement for adding or subtracting resistors of different value (not shown). However, since such attenuators are well known in the art, further details of this circuit are believed unnecessary for an understanding of the present invention.

Figure 2:
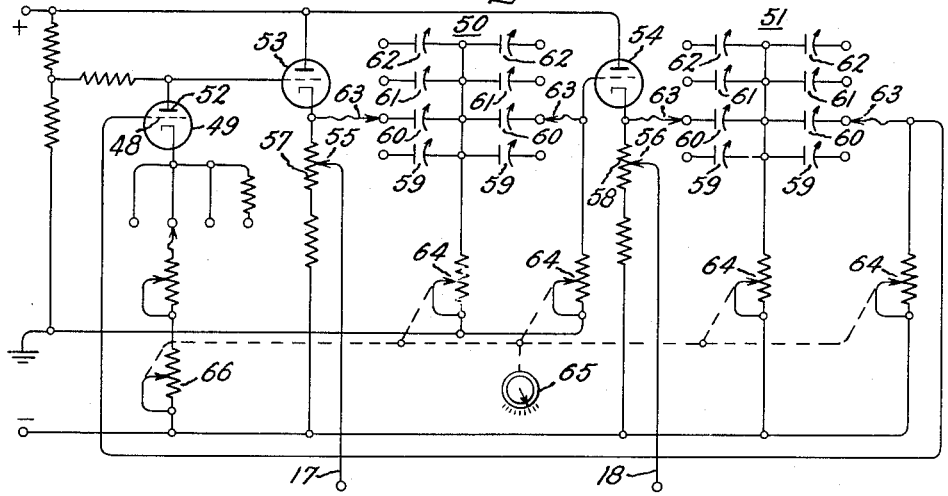
Fig. 2 is an electrical circuit illustrating a preferred form of the variable frequency oscillator of Fig. 1.

The two phase oscillator 13, as viewed in Fig. 2, is preferably comprised of a triode vacuum tube 49 having two stages or sections of resistance-capacitance networks, generally designated 50 and 51, interconnecting its plate element 52 with its control grid element 48 in a regenerative feedback connection. Separating or isolating each of these resistance-capacitance networks to prevent loading and to obtain the two 90° displaced reference signals are buffer tubes 53 and 54, which may be comprised of triode vacuum tubes in a cathode follower type circuit, as shown. The two 90° displaced reference signals are obtained from movable wipers 55 and 56 of the cathode resistors 57 and 58 in each of the buffer tube cathode circuits. For accurately varying the frequency of this oscillator over a wide range, both coarse and fine adjustment of the R-C network time constants is provided. The coarse or wide band frequency adjustment is obtained by switching in different ones of capacitors 60 through 62, inclusive, in each of the network sections by means of ganged selecting switches 63, and the fine adjustment or more gradual and precise change of frequency is obtained by varying the four R-C network resistors 64 in unison by rotating the calibrated frequency changing knob 65. For maintaining the amplitude of the reference voltage over output lines 17 and 18 constant with changes in frequency, rotation of fine control knob 65 also varies the value of resistor 66 in the cathode circuit of oscillator tube 49, thereby raising or lowering the negative bias of this tube to maintain its output constant with change in frequency.

The preferred circuitry for the phase inverters 31 and 39, as shown by Fig. 3 within dotted boxes similarly numbered 31 and 39, are both identical and each preferably includes two triode type vacuum tubes in back-to-back relation having their plate elements energized by positive voltage supplied through resistors, and their cathode elements connected together to be commonly biased by the potential across a common resistor. Considering phase inverter 39, the control grid 71 of upper tube 68 is energized by the first oscillator reference signal over line 18 through an adjusting potentiometer 72, the control grid 73 of lower tube 69 is grounded, and the cathode element of both tubes 68 and 69 are connected in common and biased by the potential across resistor 70. With this type of back-to-back connection, as known in the art, the outputs of these tubes provide signals that are 180° out of phase since the injection of a positive signal to the control grid 71 of the upper tube provides an equal and opposite negative signal at control grid 73 of the lower tube due to the presence of the common cathode feedback resistor. As a result, the plate voltage of upper tube 68 drops as the plate voltage of the lower tube 69 increases by an equal and opposite value. These phase split signals from the plates of tubes 68 and 69 are then directed over lines 40 and 41 through isolator tube circuits 42 and 43, which may be comprised of well known cathode follower amplifier circuits, as shown, to energize the opposite end terminals of sinusoidally wound potentiometer 44 with signals that are equal and 180° out of time phase.

As further shown by Fig. 3, the preferred circuitry for the adding circuit within dotted box 47, numbered to correspond with Fig. 1, preferably includes a resistor type signal summing network comprised of two series resistors 74 and 75, each energized by a different one of the signals to be summed and having a common junction connected to ground through a third resistor 76. A triode vacuum tube amplifier circuit 77 and a cathode follower type amplifier circuit 78 may be connected in cascade to impedance match or couple this summed signal to the comparator circuit 16 (shown in Fig. 1), if desired.

Although the above disclosure illustrates and describes preferred circuitry for carrying out one form of the invention, many variations may be readily made by those skilled in the art. For example, the oscillator reference voltages may be modulated in accordance with the sine and cosine of the desired angle of phase shift by electromechanical means such as angular resolvers or the like, or by electronic circuits instead of by the sinusoidally wound potentiometers as shown. Similarly, other circuitry or devices may replace the electronic oscillator shown; or may be used to compare the reference or transducer voltages; or may record and plot the measured data. Therefore, since these variations and many others may be made without departing from the spirit and scope of this invention, this invention is to be considered as limited only in accordance with the features thereof as set forth in the claims appended hereto.

What we claim as new and desire to secure by Letters Patent of the United States is:

1. Means for generating a constant-amplitude alternating-current signal that is accurately controllable in phase over a complete time cycle irrespective of frequency comprising a first computing means adapted to be energized by an alternating current source for generating an electrical signal having an amplitude controllable in proportion to the cosine of the desired angle of phase shift, a second computing means adapted to be energized by a like frequency alternating current source 90° out of time phase with said first source for generating an electrical signal having a variable amplitude controllable in proportion to the sine of the desired angle of phase shift, means for controlling each of said computing devices in synchronism, and a summing circuit for combining said first and second computed signals.

2. Means for phase shifting a reference signal in response to amplitude variation of said signal and of a second reference signal 90° out of time phase therewith, a first means energized by said reference signal for generating an electrical signal having an amplitude proportional to the cosine of desired angle of phase shift, a second means energized by the second of said reference signals for generating a second electrical signal having an amplitude proportional to the sine of the desired angle of phase shift, and means for combining said first and second reference signals whereby the resultant output signal thereof has a constant amplitude and a desired phase relation with respect to said first reference signal.

3. In a testing device for determining the frequency response of servo-mechanism components, means for generating two 90° time displaced alternating current signals at any one of a wide range of frequencies, means for directing one of said signals to energize said component and for deriving an output signal from said component, an adjustable time phase shifter energized by both said signals for generating an alternating current signal which is accurately controllable in phase over a complete time cycle irrespective of frequency, means for comparing the phase of said shifter signal with the phase of said component output signal, and means for enabling the adjustment of said shifter for correlating the phase of said two signals for each frequency of said wide range of frequencies, said time phase shifter comprising two computing circuits each energized by a different one of said signals for modifying the amplitude of these signals, one reference signal being modified in accordance with the sine of the desired angle of phase shift and the other reference signal being modified in accordance with the cosine of the desired angle of phase shift and means for combining said modified signals to derive said phase shifted alternating current signal.

4. In a testing device for determining the frequency response of servo-mechanism components, means for generating two 90° time displaced alternating current signals at any one of a wide range of frequencies, means for directing one of said signals to energize one said component and for deriving an output signal from said component, an adjustable time phase shifter energized by both said signals for generating an alternating current signal which is accurately controllable in phase over a complete time cycle irrespective of frequency, means for comparing the phase of said shifter signal with the phase of said component output signal, and means for indicating the adjustment of said shifter needed for correlating the phase of said two signals for each frequency of said wide range of frequencies, said time phase shifter comprising a sine wave potentiometer having an adjustable tap and adapted to be energized by one of said reference signals, a second sine wave potentiometer having an adjustable tap and adapted to be energized by the second reference signal, the movable taps of said sine wave potentiometers being adjustable in synchronism and the tap of said second sine wave potentiometer being physically displaced 90° from the tap of the first sine wave potentiometer, and means for adding the signals appearing at the adjustable taps of both potentiometers.

5. In a device for adjustably phase shifting any one of a wide range of alternating current reference signals of differing frequency over a complete cycle, and for effecting the same degree of phase shift for each adjustment thereof irrespective of frequency comprising a pair of adjustable non-linearly wound resistor potentiometers, one of said potentiometers adapted to be energized by said reference signal and to generate an alternating current signal having an amplitude proportional to the sine of the degree of displacement thereof, the second of said potentiometers adapted to be energized by a reference signal 90° out of phase with said first reference signal and to generate an alternating current signal having an amplitude proportional to the cosine of the degree of adjustment thereof, means coupling said potentiometers for adjustment in synchronism, and means for combining the electrical signals generated by each potentiometer.

6. In a device for adjustably phase shifting any one of a wide range of alternating current reference signals of differing frequency, and for effecting the same degree of phase shift for each adjustment irrespective of frequency comprising a pair of adjustable sinusoidally configured potentiometers, one of said potentiometers adapted to be energized by said reference signal and to generate an alternating current signal having an amplitude proportional to the cosine of the angle of adjustment thereof, the second of said potentiometers adapted to be energized by a second reference signal 90° out of time phase with said first reference signal and to generate an alternating current signal output having an amplitude proportional to the sine of the angle of adjustment thereof, means coupling said potentiometers for adjustment in synchronism, and means for adding said potentiometer outputs.

7. In a testing device for determining the frequency response of servo-mechanism components and including wherein signals of varying frequencies over a complete frequency band are directed to energize said component and are additionally directed to energize a phase shifter and attenuator in parallel therewith, and wherein the output of the component and the output of the phase shifter and attenuator are compared and the latter are adjusted to yield a null whereby the calibrated reading of the phase shifter and attenuator are representative of the response of the component at the selected frequency; a sinusoidally variable potentiometer adapted to be energized by the reference signal energizing said component, a second sinusoidally variable potentiometer adapted to be energized by a second reference signal 90° time phase displaced from said first reference signal, the first sine potentiometer adapted to generate a signal having an amplitude proportional to the cosine of adjustment thereof, and the second sine potentiometer generating a signal having an amplitude proportional to the sine of the displacement thereof, the adjustments of said sine potentiometers being connected for displacement in synchronism, and means for summing said generated signals.

8. In a phase shifter that is insensitive to frequency variation, means for synchronously modulating the amplitude of two 90° time displaced alternating current signals of the same frequency in accordance with the sine and cosine, respectively, of the desired angle of phase shift, and means for summing said modulated signals to yield the desired phase shifted signal, said modulating means including a first potentiometer having a resistance that varies sinusoidally with linear displacement of its traversing wiper, and a second impedance having a resistance that varies cosinusoidally with linear displacement of its traversing wiper, and means for interconnecting the wipers of both impedance for synchronous displacement.

9. In a device for determining the phase shift and attenuation of a signal passing through a transducer, a two phase generator for transmitting two 90° displaced electrical signals of like frequency over any one of a wide range of frequencies, means for directing a first of said signals through said transducer, an adjustable electrical network phase shifter energized by both signals for generating an alternating current reference signal accurately controllable in phase over a complete time cycle and generating a like phase shift for each given adjustment irrespective of said frequency, a calibrated variable attenuator for accurately diminishing said reference signal, means for comparing said first signal with said reference signal, and means for enabling the adjustment of said phase shifter to obtain said coincidence, and means for enabling the adjustment of said two phase generator over any one of said wide range of frequencies.

10. In a device for determining the phase shift and attenuation of a signal passing through a transducer, a two phase generator for transmitting two 90° displaced electrical signals of like frequency over any one of a wide range of frequencies, means for directing a first of said signals through said transducer, an adjustable electrical network phase shifter energized by both signals for generating an alternating current signal accurately controllable in phase over a complete time cycle, said phase shifter including means for synchronously modulating the amplitude of said first signal in accordance with the sine of the desired angle of phase shift, and means for modulating the amplitude of a second of said signals in accordance with the cosine of the desired angle of phase shift, and means for summing said modulated signals to derive said phase shifted signal, a calibrated variable attenuator for accurately diminishing said phase shifted signal, and means for comparing said phase shifted and attenuated signal with the signal being passed through said transducer to determine when these compared signals coincide in amplitude and phase.

No references cited.